(12) United States Patent
Su et al.

(10) Patent No.: US 9,127,199 B2
(45) Date of Patent: Sep. 8, 2015

(54) LIQUID CRYSTAL COMPOSITION

(71) Applicant: Chunghwa Picture Tubes, LTD., Taoyuan (TW)

(72) Inventors: Chun-Wei Su, New Taipei (TW); Jian-Hua Chen, Changhua County (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 42 days.

(21) Appl. No.: 14/059,471

(22) Filed: Oct. 22, 2013

(65) Prior Publication Data

US 2015/0060734 A1  Mar. 5, 2015

(30) Foreign Application Priority Data

Aug. 30, 2013 (TW) ............................ 102131267 A

(51) Int. Cl.
| | | |
|---|---|---|
| C09K 19/54 | (2006.01) | |
| C09K 19/20 | (2006.01) | |
| C09K 19/18 | (2006.01) | |
| C09K 19/24 | (2006.01) | |
| C09K 19/30 | (2006.01) | |

(52) U.S. Cl.
CPC ............... *C09K 19/542* (2013.01); *C09K 19/18* (2013.01); *C09K 19/2007* (2013.01); *C09K 19/24* (2013.01); *C09K 19/3059* (2013.01); *C09K 19/3068* (2013.01); *C09K 19/3086* (2013.01); *C09K 19/54* (2013.01); *C09K 2019/185* (2013.01); *C09K 2019/2064* (2013.01); *C09K 2019/3078* (2013.01)

(58) Field of Classification Search
CPC .. C09K 19/542; C09K 19/2007; C09K 19/18; C09K 19/24; C09K 19/3059; C09K 19/3068; C09K 19/3086; C09K 19/54; C09K 2019/3078; C09K 2019/2064; C09K 2019/185
USPC ............... 428/1.1; 252/299.5, 299.63, 299.66
See application file for complete search history.

(56) References Cited

U.S. PATENT DOCUMENTS

| | | |
|---|---|---|
| 4,462,924 A | 7/1984 | Raynes |
| 4,759,870 A | 7/1988 | Fujimura |
| 4,822,519 A | 4/1989 | Saito et al. |
| 4,834,906 A | 5/1989 | Coates et al. |
| 5,518,654 A | 5/1996 | Coates |
| 2012/0229744 A1 | 9/2012 | Hattori et al. |
| 2014/0016078 A1* | 1/2014 | Su et al. .................. 349/158 |

FOREIGN PATENT DOCUMENTS

| | | |
|---|---|---|
| CN | 101812302 | 8/2010 |
| CN | 102876334 | 1/2013 |
| TW | 200427822 | 12/2004 |

OTHER PUBLICATIONS

"Office Action of Taiwan Counterpart Application", issued on Oct. 7, 2014, p. 1-p. 5.

* cited by examiner

*Primary Examiner* — Geraldina Visconti
(74) *Attorney, Agent, or Firm* — Jianq Chyun IP Office

(57) ABSTRACT

A liquid crystal composition including a first liquid crystal monomer, and a second liquid crystal monomer, wherein the ratio of the first liquid crystal monomer is 5 wt % to 10 wt % and the ratio of the second liquid crystal monomer is 90 wt % to 95 wt %, based on the total weight of the first liquid crystal monomer and the second liquid crystal monomer. The first liquid crystal monomer is selected from the group consisting of tetra-cyclic compounds represented by formula 1 to formula 6:

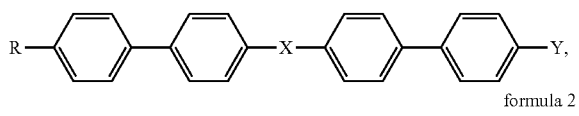

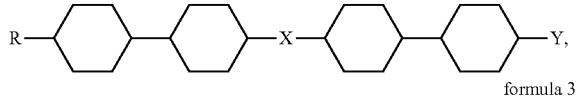

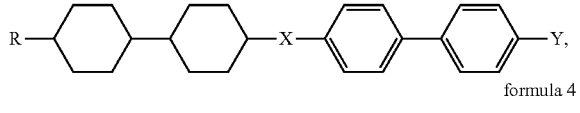

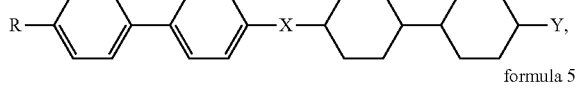

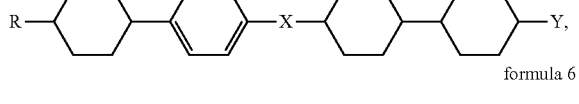

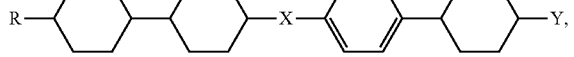

wherein R is $C_3$-$C_{12}$ alkyl group, X is —COO—, —C≡C—, or —N=N—, and Y is —CN. The second liquid crystal monomer includes a bicyclic structure or a tricyclic structure.

8 Claims, 2 Drawing Sheets

LIQUID CRYSTAL COMPOSITION

CROSS-REFERENCE TO RELATED APPLICATION

This application claims the priority benefit of Taiwan application serial no. 102131267, filed on Aug. 30, 2013. The entirety of the above-mentioned patent application is hereby incorporated by reference herein and made a part of this specification.

BACKGROUND OF THE INVENTION

1. Field of the Invention

The invention is related to a liquid crystal composition, and more particularly, to a liquid crystal composition including a liquid crystal monomer having a tetra-cyclic structure.

2. Description of Related Art

In recent years, with the development of technology, the transparent liquid crystal display (LCD) has become one of the directions the optoelectronics industry strives toward. In terms of the current transparent LCD, scattering and transmissive display modes are formed based on whether or not a voltage is driven such that display effects can be achieved without attaching a polarizer. Therefore, the current transparent LCD has the advantages of a simple process and low manufacturing costs.

However, since the liquid crystal used by the current transparent LCD usually has the disadvantage of poor scattering state, poor display characteristics and severely limited applicability are existing issues of the transparent LCD. Therefore, improving the scattering state and the contrast of the liquid crystal is a current issue that urgently needs to be solved.

SUMMARY OF THE INVENTION

The invention provides a liquid crystal composition. The liquid crystal composition has the characteristics of high scattering state and high contrast after polymerization.

The liquid crystal composition of the invention includes a first liquid crystal monomer and a second liquid crystal monomer, wherein the ratio of the first liquid crystal monomer is 5 wt % to 10 wt % and the ratio of the second liquid crystal monomer is 90 wt % to 95 wt %, based on the total weight of the first liquid crystal monomer and the second liquid crystal monomer. The first liquid crystal monomer is selected from the group consisting of tetra-cyclic compounds represented by formula 1 to formula 6:

formula 1

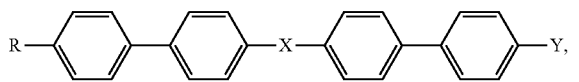

formula 2

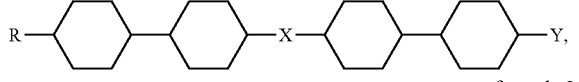

formula 3

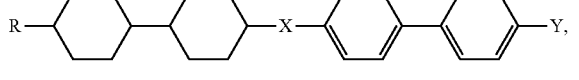

-continued formula 4

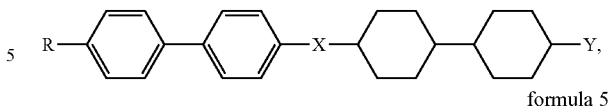

formula 5

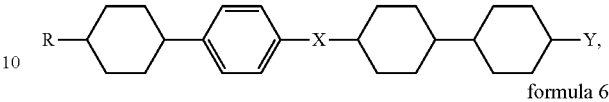

formula 6

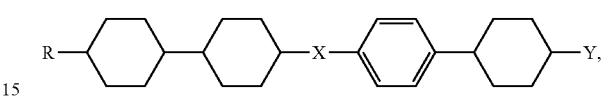

wherein R is $C_3$-$C_{12}$ alkyl group, X is —COO—, —C≡C—, or —N=N—, and Y is —CN. The second liquid crystal monomer includes a bicyclic structure or a tricyclic structure.

Based on the above, the liquid crystal composition provided by the invention includes a liquid crystal monomer having a tetra-cyclic structure such that the liquid crystal composition has the characteristics of high scattering state and high contrast after polymerization.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
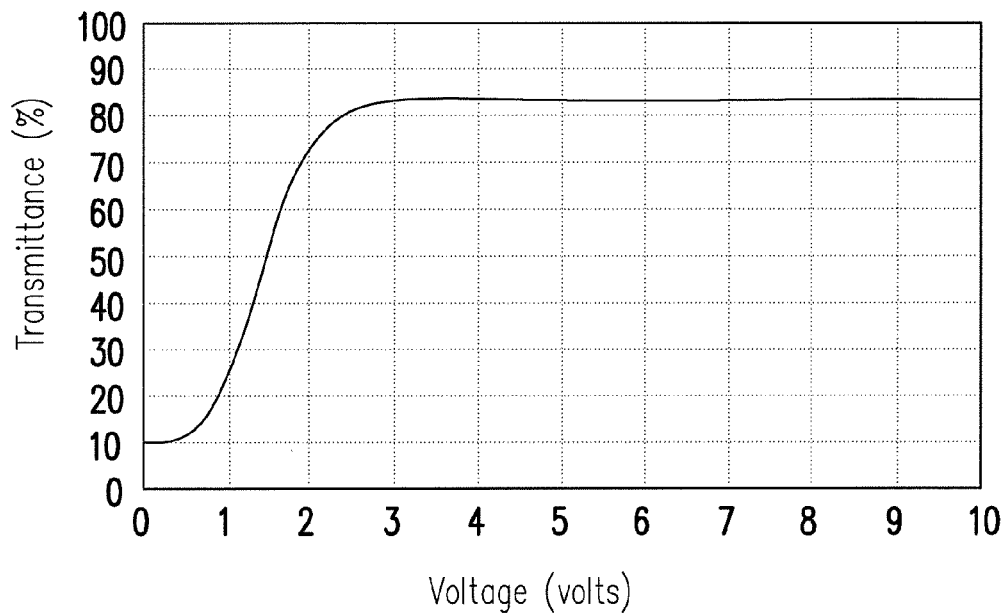
FIG. 1 is a diagram of the relationship between the driving voltage and the transmittance of a test cell injected with the liquid crystal composition of the comparative example.

In the specification, skeletal formulas are sometimes used to represent structures of compounds. Such representation can omit carbon atoms, hydrogen atoms, and carbon-hydrogen bonds. Certainly, structural formulas with clear illustrations of functional groups are definitive.

In the present text, scopes represented by "a numerical value to another numerical value" are schematic representations of avoiding listing all of the numerical values in the scopes in the specification. Therefore, the recitation of a specific numerical range covers any numerical value in the numerical range and a smaller numerical range defined by any numerical value in the numerical range, as is the case with any numerical value and a smaller numerical range thereof in the specification.

To prepare a liquid crystal composition capable of achieving the characteristics of high scattering state and high contrast, the invention provides a liquid crystal composition capable of achieving the advantages. In the following, embodiments are listed as examples of actual implementation of the invention.

The liquid crystal composition provided by the invention includes a first liquid crystal monomer and a second liquid crystal monomer, wherein the ratio of the first liquid crystal monomer is 5 wt % to 10 wt % and the ratio of the second liquid crystal monomer is 90 wt % to 95 wt %, based on the total weight of the first liquid crystal monomer and the second liquid crystal monomer. The two components are described in detail below.

The first liquid crystal monomer of the invention is selected from the group consisting of tetra-cyclic compounds represented by formula 1 to formula 6:

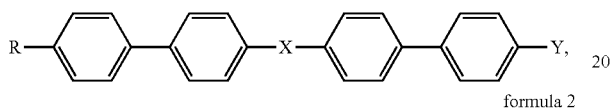

formula 1

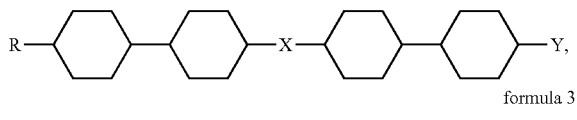

formula 2 formula 3

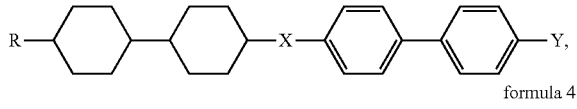

formula 4 formula 5 formula 6 wherein R is a $C_3$-$C_{12}$ alkyl group, X is —COO—, —C≡C—, or —N=N—, and Y is —CN.

Specifically, the first liquid crystal monomer of the invention is a tetra-cyclic compound. Moreover, in an embodiment, the first liquid crystal monomer is, for instance, the compound represented by formula 1. Besides, the compound represented by formula 1 can be the compound represented by formula 7:

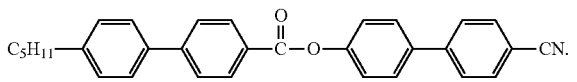

formula 7

The second liquid crystal monomer of the invention includes a bicyclic structure or a tricyclic structure, and the cyclic structure can be a benzene ring, a cyclohexane ring, or a heterocyclic ring. In addition, since the first liquid crystal monomer includes a tetra-cyclic structure and the second liquid crystal monomer includes a bicyclic structure or a tricyclic structure, in comparison to the second liquid crystal monomer, the first liquid crystal monomer has high birefringence and a high clearing point. Besides, the second liquid crystal monomer is, for instance, a commercial product. In an embodiment, the second liquid crystal monomer is, for instance, selected from the group consisting of compounds represented by formula 8 to formula 11:

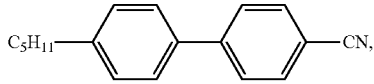

formula 8

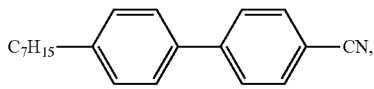

formula 9

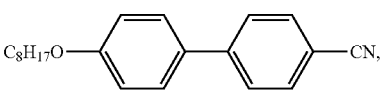

formula 10

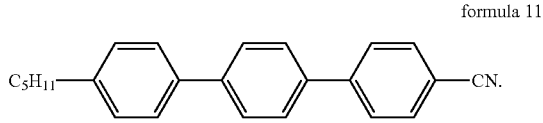

formula 11

Additionally, although the compounds represented by formula 8 to formula 11 are disclosed, the second liquid crystal monomer of the invention is not limited thereto; any liquid crystal monomer having a bicyclic structure or a tricyclic structure known by those having ordinary skill in the art falls under the scope of the invention.

The liquid crystal composition of the invention can further include a polymerizable material. Based on the total weight of the liquid crystal composition, the ratio of the polymerizable material is between about 20 wt % and 50 wt %. The polymerizable material includes a polyol acrylate oligomer, a liquid crystal polymerization initiator, a difunctional acrylate monomer, a polythiol monomer, and a combination thereof. Based on the total weight of the polymerizable material, the ratio of the polyol acrylate oligomer is 10 wt % to 30 wt %, the ratio of the liquid crystal polymerization initiator is 0.5 wt % to 5 wt %, the ratio of the difunctional acrylate monomer is 10 wt % to 30 wt %, and the ratio of the polythiol monomer is 10 wt % to 30 wt %. Moreover, the polymerizable material can further include a solvent.

In an embodiment, the polyol acrylate oligomer is, for instance, the compound represented by formula 12:

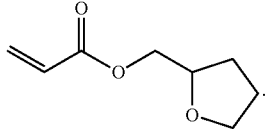

formula 12

In an embodiment, the liquid crystal polymerization initiator used by the polymerizable material is, for instance, a thermal initiator or a photo-initiator. Specifically, the liquid crystal polymerization initiator of the invention is, for instance, PN-23 thermal initiator or PN-31J thermal initiator produced by Seaen Special Material Co., Ltd. Alternatively, the liquid crystal polymerization initiator of the invention is, for instance, the compound represented by formula 13:

formula 13

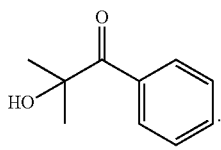

In an embodiment, the difunctional acrylate monomer is, for instance, the compound represented by formula 14:

formula 14

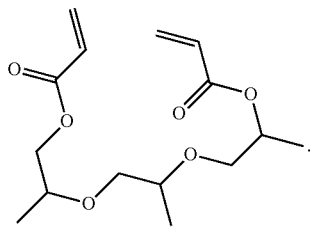

In an embodiment, the polythiol monomer is, for instance, the compound represented by formula 15:

formula 15

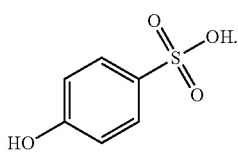

In an embodiment, the solvent used to dilute the concentration of the polymer is, for instance, isobutyl alcohol (IBA), methyl ethyl ketone (MEK), or propylene glycol monomethyl ether acetate (PMA).

It should be mentioned that, as described above, since the first liquid crystal monomer has high birefringence and a high clearing point, after the first liquid crystal monomer reacts with the polymerizable material (described below), better matching of scattering state is generated. As a result, the liquid crystal composition of the invention has the characteristics of high scattering state and high contrast. In an embodiment, the effect of scattering state of the liquid crystal composition of the invention is about 1.5% to 3%, the effect of transmissive state is about 80% to 85%, and the contrast is about 25 to 50.

Furthermore, after the liquid crystal composition is, for instance, heated or irradiated such that the liquid crystal composition generates a polymerization reaction, the polymerized liquid crystal composition can be used as a liquid crystal layer suitable for a transparent LCD; the reason thereof is described below.

The difunctional acrylate monomer and the liquid crystal polymerization initiator in the polymerizable material may facilitate the polymerization reaction of the polyol acrylate oligomer having similar properties to a surfactant and a part of the first liquid crystal monomer and the second liquid crystal monomer such that polymer liquid crystal cells are formed on the surface of each of the two substrates of the transparent LCD opposite to each other. Moreover, through the polythiol monomer in the polymerizable material, the adhesion between the surface of each of the two substrates of the transparent LCD and the polymer liquid crystal cells can be further strengthened such that the polymer liquid crystal cells are more readily distributed on the surface of each of the substrates. When potential difference exists between the two substrates, the directions of the optical axis of the polymer liquid crystal cells are substantially parallel to each other, and therefore incident light can pass through the transparent LCD at this point such that a partial region of the transparent LCD is in a transparent state. On the other hand, when the potential difference between the two substrates is substantially zero, the directions of the optical axis of the polymer liquid crystal cells substantially intersect to each other, and therefore incident light is scattered by the polymer liquid crystal cells at this point such that a partial region of the transparent LCD is in a scattering state.

In this way, by using the display mode of each of the transparent state and the scattering state, the transparent LCD including the liquid crystal composition of the invention can display images without using a polarizer. Moreover, through the use of the first liquid crystal monomer, the display characteristics of the transparent LCD can be enhanced. Moreover, in an embodiment, the transparent LCD can be a transmissive display or a reflective display.

In the following, the liquid crystal composition of each of a comparative example and experimental examples 1-3 is described, and the transmission characteristics of each of the liquid crystal compositions under different voltages are measured to explain the liquid crystal characteristics of each of the liquid crystal compositions.

The main materials used in the preparation of the liquid crystal composition of each of the comparative example and experimental examples 1-3 are as shown below:

first liquid crystal monomer: compound represented by formula 7;

second liquid crystal monomer: compounds represented by formula 8 to formula 11;

polymerizable material: compounds represented by formula 12 to formula 15, and solvent is isobutyl alcohol.

The method of preparing the liquid crystal composition of each of the comparative example and experimental examples 1-3 includes mixing the first liquid crystal monomer, the second liquid crystal monomer, and the polymerizable material, wherein the compositions and the ratios thereof of the first liquid crystal monomer and the second liquid crystal monomer in the liquid crystal composition of each of the comparative example and experimental examples 1-3 are listed in Table 1. Moreover, in the liquid crystal composition of each of the comparative example and experimental examples 1-3, the weight percentage of the polymerizable material is 20% to 50% and the composition ratio of the polymerizable material is the same. Specifically, in the polymerizable material, the weight percentage of the compound represented by formula 12 is 10% to 30%, the weight percentage of the compound represented by formula 13 is 0.5% to 5%, the weight percentage of the compound represented by formula 14 is 10% to 30%, and the weight percentage of the compound represented by formula 15 is 10% to 30%.

TABLE 1

| wt % (based on total weight of first liquid crystal monomer and second liquid crystal monomer) | first liquid crystal monomer compound represented by formula 7 | second liquid crystal monomer | | | |
|---|---|---|---|---|---|
| | | compound represented by formula 8 | compound represented by formula 9 | compound represented by formula 10 | compound represented by formula 11 |
| Comparative example | — | 51 | 25 | 16 | 8 |
| Experimental example 1 | 5-10 | 50-60 | — | 20-30 | 5-10 |
| Experimental example 2 | 5-10 | 50-60 | 20-30 | — | 5-10 |
| Experimental example 3 | 5-10 | 40-50 | 10-20 | 10-20 | 5-10 |

The transmittance of the liquid crystal composition of each of the comparative example and experimental examples 1-3 is measured, and the measurement results are as shown in FIG. 1 to FIG. 4.

Figure 2:
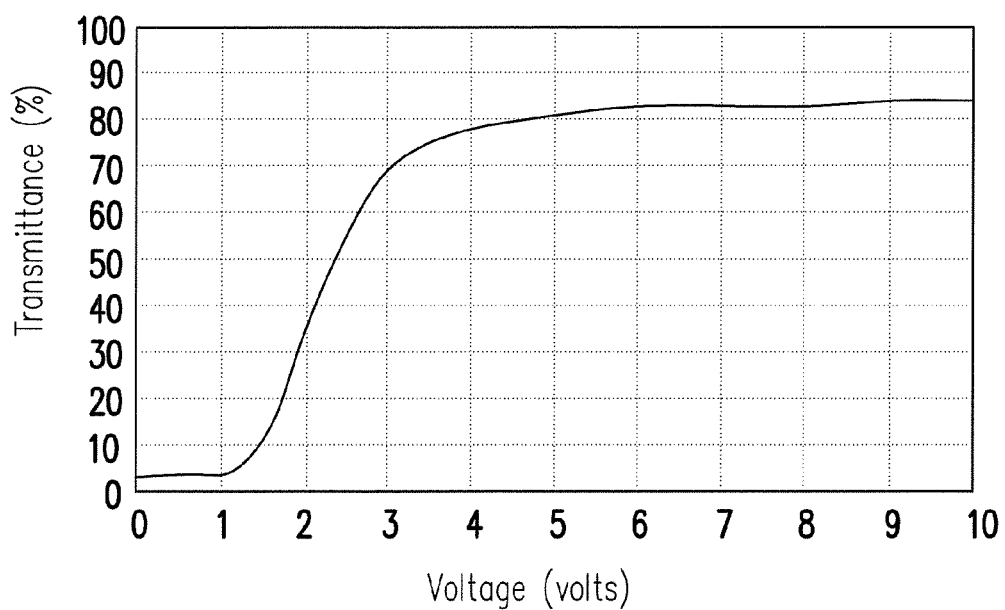
FIG. 2 is a diagram of the relationship between the driving voltage and the transmittance of a test cell injected with the liquid crystal composition of experimental example 1.
Figure 3:
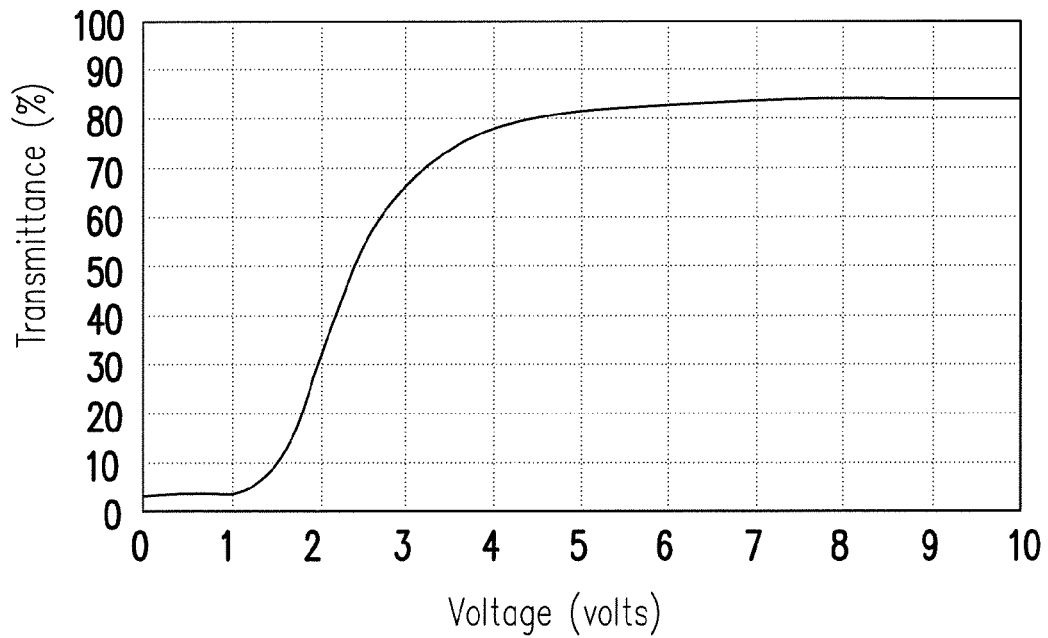
FIG. 3 is a diagram of the relationship between the driving voltage and the transmittance of a test cell injected with the liquid crystal composition of experimental example 2.
Figure 4:
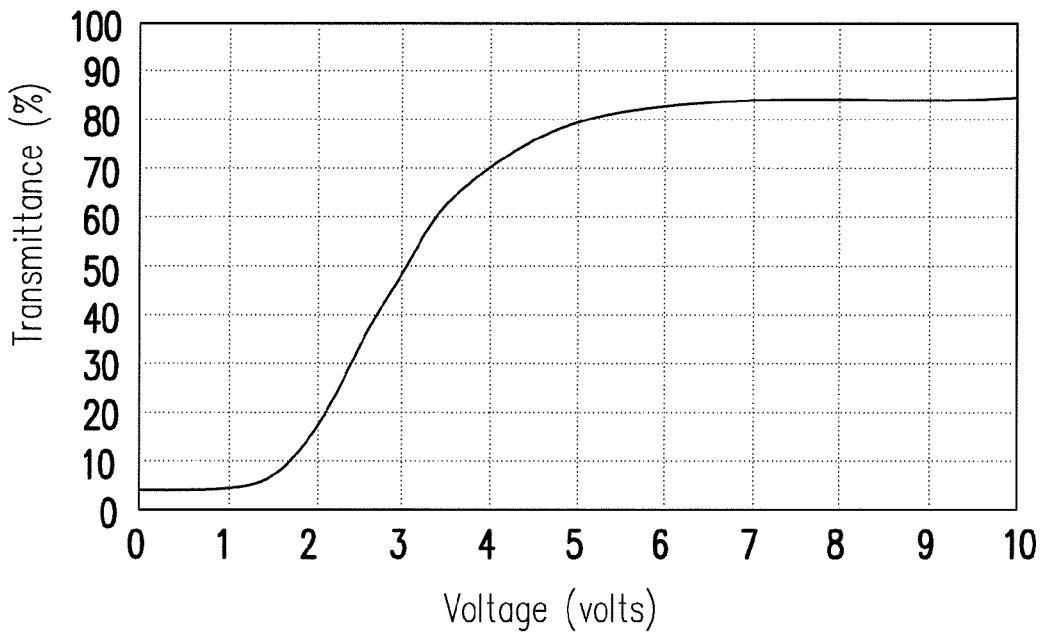
FIG. 4 is a diagram of the relationship between the driving voltage and the transmittance of a test cell injected with the liquid crystal composition of experimental example 3.

FIG. 1 is a diagram of the relationship between the driving voltage and the transmittance of a test cell injected with the liquid crystal composition of the comparative example. FIG. 2 is a diagram of the relationship between the driving voltage and the transmittance of a test cell injected with the liquid crystal composition of experimental example 1. FIG. 3 is a diagram of the relationship between the driving voltage and the transmittance of a test cell injected with the liquid crystal composition of experimental example 2. FIG. 4 is a diagram of the relationship between the driving voltage and the transmittance of a test cell injected with the liquid crystal composition of experimental example 3. The measurement steps include providing a test cell including two substrates disposed opposite to each other with each of the two substrates having a conductive film; injecting a liquid crystal composition between the two substrates; and then performing an irradiation process on the test cell.

It is known from FIG. 1 to FIG. 4 that, in comparison to the liquid crystal composition of the comparative example not containing the first liquid crystal monomer, when the driving voltage of the liquid crystal composition of each of experimental examples 1-3 containing the first liquid crystal monomer is zero (i.e., scattering state), lower transmittance (about 3%) is observed. Moreover, in the transparent state, the liquid crystal composition of each of experimental examples 1-3 containing the first liquid crystal monomer is observed to have considerable transmittance (about 83%). Furthermore, it can also be known that, in comparison to the test cell injected with the liquid crystal composition of the comparative example not containing the first liquid crystal monomer, the contrast of the test cell injected with the liquid crystal composition of each of experimental examples 1-3 containing the first liquid crystal monomer is higher (about 28). In other words, the relationship between the driving voltage and the transmittance of the test cells can prove that the liquid crystal composition of the invention does have the characteristics of high scattering state and high contrast and that the display characteristics of transparent LCDs fabricated with the liquid crystal composition are good.

Based on the above, the liquid crystal composition provided by the invention includes a liquid crystal monomer having a tetra-cyclic structure such that the liquid crystal composition has the characteristics of high scattering state and high contrast after polymerization. Moreover, the liquid crystal composition provided by the invention is suitable for transparent LCDs and can enhance the display characteristics thereof.

What is claimed is:
1. A liquid crystal composition, comprising:
a first liquid crystal monomer selected from the group consisting of tetra-cyclic compounds represented by formula 1 to formula 6:

formula 1

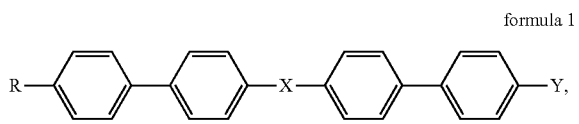

formula 2 formula 3

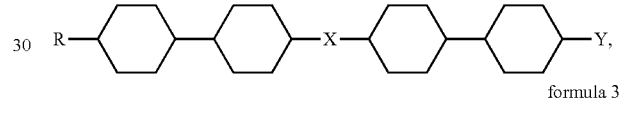

formula 4 formula 5

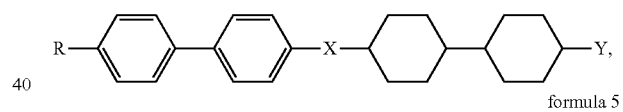

formula 6 wherein R is a $C_3$-$C_{12}$ alkyl group, X is —COO—, —C≡C—, or —N═N—, and Y is —CN; and
a second liquid crystal monomer comprising a bicyclic structure or a tricyclic structure, selected from the group consisting of compounds represented by formula 8 to formula 11:

formula 8 formula 9

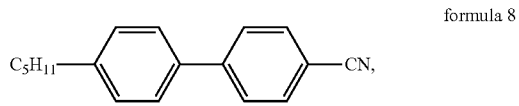

-continued

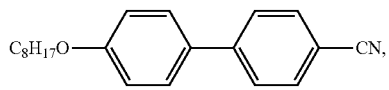
formula 10

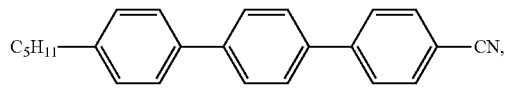
formula 11 wherein based on a total weight of the first liquid crystal monomer and the second liquid crystal monomer, a ratio of the first liquid crystal monomer is 5 wt % to 10 wt % and a ratio of the second liquid crystal monomer is 90 wt % to 95 wt %.

2. The liquid crystal composition of claim 1, wherein the first liquid crystal monomer is represented by formula 1:

formula 1

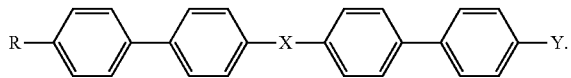

3. The liquid crystal composition of claim 1, wherein the first liquid crystal monomer is represented by formula 7:

formula 7

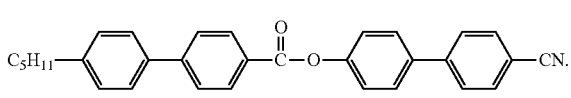

4. The liquid crystal composition of claim 1, further comprising a polymerizable material comprising a polyol acrylate oligomer, a liquid crystal polymerization initiator, a difunctional acrylate monomer, a polythiol monomer, and a combination thereof, wherein based on a total weight of the liquid crystal composition, a ratio of the polymerizable material is 20 wt % to 50 wt %.

5. The liquid crystal composition of claim 4, wherein the polyol acrylate oligomer comprises:

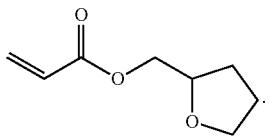

6. The liquid crystal composition of claim 4, wherein the liquid crystal polymerization initiator comprises:

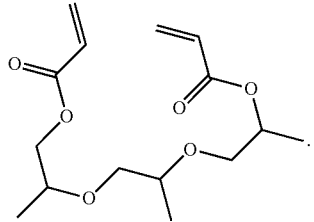 [SMILES: C=CC(=O)OCC(C)OCC(C)OCC(C)OC(=O)C=C]

7. The liquid crystal composition of claim 4, wherein the difunctional acrylate monomer comprises:

8. The liquid crystal composition of claim 4, wherein the polythiol monomer comprises:

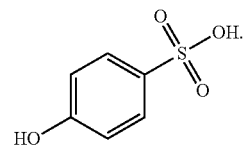 [SMILES: O=S(=O)(O)c1ccc(O)cc1]

* * * * *